(12) United States Patent
Moro et al.

(10) Patent No.: US 7,677,732 B2
(45) Date of Patent: Mar. 16, 2010

(54) STEREOSCOPIC IMAGE DISPLAY APPARATUS

(75) Inventors: Shuji Moro, Tokyo (JP); Toshitaka Kawashima, Kanagawa (JP); Ryota Odake, Tokyo (JP); Tadashi Morimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 583 days.

(21) Appl. No.: 11/484,759

(22) Filed: Jul. 12, 2006

(65) Prior Publication Data

US 2007/0046899 A1  Mar. 1, 2007

(30) Foreign Application Priority Data

Jul. 12, 2005  (JP) ............... 2005-203367

(51) Int. Cl.
G03B 21/00 (2006.01)
G02B 27/22 (2006.01)
H04N 15/00 (2006.01)
H04N 13/00 (2006.01)
H04N 13/04 (2006.01)
H04N 9/47 (2006.01)

(52) U.S. Cl. ............... 353/7; 348/42; 348/51; 348/52; 348/54; 359/462; 359/475

(58) Field of Classification Search .............. 353/10, 353/6–9, 122, 94; 359/376–378, 23, 455–458, 359/462–479; 348/42–60, E13.001–E13.075, 348/E15.001
See application file for complete search history.

(56) References Cited

U.S. PATENT DOCUMENTS

| | | | | |
|---|---|---|---|---|
| 2,845,618 A * | 7/1958 | Huffman | ............... | 348/52 |
| 5,671,992 A * | 9/1997 | Richards | ............... | 353/7 |
| 5,719,701 A * | 2/1998 | Sudo | ............... | 359/464 |
| 6,178,043 B1 * | 1/2001 | Son et al. | ............... | 359/462 |
| 6,304,286 B1 * | 10/2001 | Shirai et al. | ............... | 348/51 |
| 6,547,400 B1 * | 4/2003 | Yokoyama | ............... | 353/98 |
| 7,040,767 B2 * | 5/2006 | Lee et al. | ............... | 353/99 |
| 7,150,531 B2 * | 12/2006 | Toeppen | ............... | 353/7 |
| 7,396,136 B2 * | 7/2008 | Kim et al. | ............... | 353/94 |
| 7,467,885 B2 * | 12/2008 | Grotsch et al. | ............... | 362/555 |
| 2003/0020878 A1 * | 1/2003 | Ohshima et al. | ............... | 353/7 |
| 2005/0117016 A1 * | 6/2005 | Surman | ............... | 348/51 |
| 2005/0280894 A1 * | 12/2005 | Hartkop et al. | ............... | 359/464 |
| 2006/0012753 A1 * | 1/2006 | Gandara et al. | ............... | 353/7 |
| 2006/0221303 A1 * | 10/2006 | Sonehara | ............... | 353/8 |

FOREIGN PATENT DOCUMENTS

| | | |
|---|---|---|
| JP | 2000-509591 A | 7/2000 |
| JP | 2002-258215 A | 9/2002 |
| WO | WO-98/34411 A1 | 8/1998 |

* cited by examiner

Primary Examiner—Georgia Y Epps
Assistant Examiner—Jori S Byrne-Diakun
(74) Attorney, Agent, or Firm—Rader, Fishman & Grauer PLLC

(57) ABSTRACT

The present invention provides a stereoscopic image display apparatus. The stereoscopic image display apparatus includes a first projection element group, a second projection element group, and a reflecting optical system. The first projection element group includes a plurality of first projection elements operable to project first light fluxes in a first direction. The second projection element group includes a plurality of second projection elements operable to project second light fluxes in a second direction which is different from the first direction and in which the second light fluxes are directed to the first light fluxes. The reflecting optical system is operable to reflect the second light fluxes toward the first direction.

11 Claims, 11 Drawing Sheets

STEREOSCOPIC IMAGE DISPLAY APPARATUS

CROSS REFERENCES TO RELATED APPLICATIONS

The present invention contains subject matter related to Japanese Patent Application JP 2005-203367 filed in the Japanese Patent Office on Jul. 12, 2005, the entire content of which being incorporated herein by reference.

BACKGROUND OF THE INVENTION

1. Field of the Invention

This invention relates to a stereoscopic image display apparatus which projects a stereoscopic still picture or moving picture to display a stereoscopic image.

2. Description of the Related Art

A projector is known which projects light to produce and display an image on a screen or the like. Generally, a projector uses a white lamp as a light source and modulates light emitted from the white lamp with a modulation element such as, for example, a liquid crystal element to form an image. The image formed in this manner is projected on a screen or the like using various kinds of lenses. Also an apparatus is known which includes a plurality of liquid crystal elements or a plurality of projectors by which images having a parallax are produced. The images produced in this manner are projected by a projection lens to display a stereoscopic image. The apparatus of the type described is disclosed, for example, in Japanese Patent Laid-open No. 2002-258215 (refer particularly to FIG. 4) (hereinafter referred to as Patent Document 1).

Also a display apparatus which can project a stereoscopic image is known and disclosed, for example, in JP-A-2000-509591 (refer particularly to FIGS. 1 and 9) (hereinafter referred to as Patent Document 2). The display apparatus has a first light emitting face for projecting light including image information picked up, for example, from multiple eye points and a second light emitting face spaced by a predetermined distance from the first light emitting face. The second light emitting face is formed from pixels disposed two-dimensionally. As light is emitted from the first light emitting face toward the second light emitting face, a stereoscopic image is formed on the second light emitting face such that it can be observed by an observer. Patent Document 2 further discloses a modified apparatus. Light fluxes from the first light emitting face (light emitting points S1, S2, . . . ) are reflected by a mirror disposed sidewardly so that it is introduced to the second light emitting face (pixels P1, P2, . . . ) (refer particularly to FIG. 9 of Patent Document 2). This is effective to reduce the pitch of the light emitting points S1, S2, . . . .

SUMMARY OF THE INVENTION

However, since the light emitting points have a finite magnitude, it is necessary to contrive how to arrange the light emitting points. As the number of light emitting points and the number of pixels increases, an image of higher picture quality and higher definition is obtained. Accordingly, where the light emitting points are projectors, it is a significant subject in what manner a greater number of projectors are arranged in a juxtaposed relationship or in what manner the paths of light fluxes projected from the projectors are arranged.

Further, in order to display a natural stereoscopic image of high picture quality and high definition, it is necessary to minimize the displacement amount between individual images projected from the projectors and the pitch of the optical axes of the projectors.

It is therefore desirable to provide a stereoscopic image display apparatus that a plurality of projection elements or the paths of light fluxes projected from the projection elements are arranged suitably so that a stereoscopic image of high picture quality can be produced.

According to an embodiment of the present invention, a stereoscopic image display apparatus includes a first projection element group, a second projection element group, and a reflecting optical system. The first projection element group includes a plurality of first projection elements operable to project first light fluxes in a first direction. The second projection element group includes a plurality of second projection elements operable to project second light fluxes in a second direction which is different from the first direction and in which the second light fluxes are directed to the first light fluxes. The reflecting optical system is operable to reflect the second light fluxes toward the first direction.

Since there is a limitation to reduction in size of the first and second projection elements themselves, in the stereoscopic image display apparatus according to the embodiment of the present invention, a reflecting optical system is used to reflect the second light fluxes to display an image. Consequently, the displacement amount (image pitch) between adjacent ones of images to be displayed by the first and second projection elements can be minimized, and therefore, a stereoscopic image of high picture quality and high definition can be displayed. In addition, in the stereoscopic image display apparatus, the first and second projection element groups are disposed such that the second light fluxes projected from the second projection element group are directed toward the first light fluxes projected from the first projection element group. In other words, where the reflecting optical system includes a mirror, the mirror is disposed on the inner side of the first and second projection element groups, and therefore, the light paths of the first and second light fluxes can be disposed densely. Where the light paths are disposed densely, miniaturization of the stereoscopic image display apparatus can be anticipated.

The reflection factor of the second light fluxes by the reflecting optical system may be 100% or lower than 100%. Where the reflection factor is lower than 100%, a baffle plate or the like operable to intercept the second light fluxes after having passed through the reflecting optical system may be provided.

The reflecting optical system may include, for example, a mirror. The reflection optical system may include an optical member such as a lens in addition to a mirror. The optical member here is, for example, an optical member necessary to display the second light fluxes appropriately.

In order to obtain a natural stereoscopic image of high picture quality and high definition, preferably the pitch of the first projection elements or the pitch of the second projection elements is minimized.

In a preferred form of the stereoscopic image display apparatus, the first light fluxes have a first light path length, and the second light fluxes have a second light path length substantially equal to the first light path length. In the stereoscopic image display apparatus, the second light fluxes are projected as if they were projected in the same direction as that from the first projection element group. Therefore, the necessity for correction of image data by the second projection element group, image processing, and so forth to make the projection distance of the second light fluxes equal to that of the image light fluxes from the first projection element group is eliminated. The necessity to provide the second projection elements with an optical system and so forth of a configuration different from that of the first projection elements so that the projection distance of the second light fluxes may become equal to that of the image light fluxes from the first projection element group is eliminated as well. The projection distance signifies a distance from each of the first projection elements to the eyes of an observer or, where a screen is provided, a distance from each of the first projection elements to the screen. Accordingly, it is possible to form the optical systems and so forth of all of the first and second projection elements so as to have the same configuration. As a result, the productivity of the stereoscopic image display apparatus is enhanced.

In other words, in the stereoscopic image display apparatus, although the second light fluxes are projected as if they were projected from the same direction as that from the first projection element group, the pitch of the projection elements, that is, the pitch of the optical axes of the first and second light fluxes, can be reduced when compared with that in an alternative case. The first and second projection element groups actually project the respective light fluxes in the same direction without the necessity for correction of data or without using a different optical system or the like as described above.

In particular, the first and second projection elements can be disposed such that the distance between first optical axes of the first light fluxes and second optical axes of those of the second light fluxes which are nearest to the first optical axes is smaller than the distance between the first optical axes.

In the present specification, the term "optical axis" signifies a center line of a light flux projected from a projection element.

In the stereoscopic image display apparatus, the reflecting optical system may include a reflecting surface disposed at a position at which the reflecting surface does not intercept the first light fluxes. Thereby, the stereoscopic image display apparatus can be formed in a simplified configuration. Besides, the reflecting surface may be disposed such that it intercepts the first light fluxes. In this case, the reflection factor of the reflection surface may be set to a value lower than 100%, and the light amounts of the first and second light fluxes may be adjusted.

For the reflecting optical system, for example, the one including a mirror, a prism or the like may be used.

Preferably, the first direction and the second direction substantially make the right angle, and the reflecting angle of the second light fluxes by the reflecting optical system is approximately 45°. With the configuration just described, the stereoscopic image display apparatus can be implemented in a simplified configuration.

Preferably, the stereoscopic image display apparatus further includes a third projection element group disposed in an opposing relationship to the second projection light element group across the optical axis of the first light fluxes. The configuration just described increases the total number of projection elements and therefore allows achievement of display of a stereoscopic image of higher picture quality and higher definition.

Each of the first projection elements may include a plurality of light sources operable to allow the image to be displayed as a color image. In other words, one first projection element may include a plurality of light sources. This is applicable not only to the first projection element but also to the second or third projection elements. For the light sources, for example, a lamp, a light emitting diode, or the like may be used. Where each projection element includes a plurality of light sources in this manner, although the size of the projection element (first or second projection element) increases when compared with an alternative projection element which includes a single light source, the projection elements can be arranged more densely.

In particular, each of the first projection elements has a housing which has a dimension greatest in a third direction within a plane substantially perpendicular to the first direction, and the first projection elements are disposed in a displaced relationship in a direction substantially perpendicular to the third direction in the plane. Consequently, the pitch of the first projection elements can be minimized. The configuration described can be applied not only to the first projection elements but also to the second or third projection elements.

According to another embodiment of the present invention, a stereoscopic image display apparatus includes a first projection element group, a second projection element group, and an optical system. The first projection element group includes a plurality of first projection elements operable to project first light fluxes in a first direction. The second projection element group includes a plurality of second projection elements operable to project second light fluxes in a second direction which is different from the first direction and in which the second light fluxes are directed to the first light fluxes. The optical system includes mirror that allows the first light fluxes to pass therethrough and reflects the second light fluxes to display an image by the second light fluxes.

In the stereoscopic image display apparatus, the first light fluxes of the first projection elements before passing through the mirror have a first light amount, and the second light beams before totally reflected by the mirror have a second light amount smaller than the first light amount. Therefore, if the light amounts of the first and second light sources are set suitably, for example, in response to the transmission factor of the mirror, then the light amounts of the first and second light fluxes to be used for final display can be set substantially equal to each other. However, it is not necessary that the final light amounts are equal to each other, but the second light amount may be smaller than the first light amount.

In summary, with the stereoscopic image display apparatus according to the embodiments of the present invention, a natural stereoscopic image of high definition and high picture quality can be produced.

The above and other features and advantages of the present invention will become apparent from the following description and the appended claims, taken in conjunction with the accompanying drawings in which like parts or elements denoted by like reference symbols.

DETAIED DESCRIPTION OF THE PREFERRED EMBODIMENTS

Figure 1:
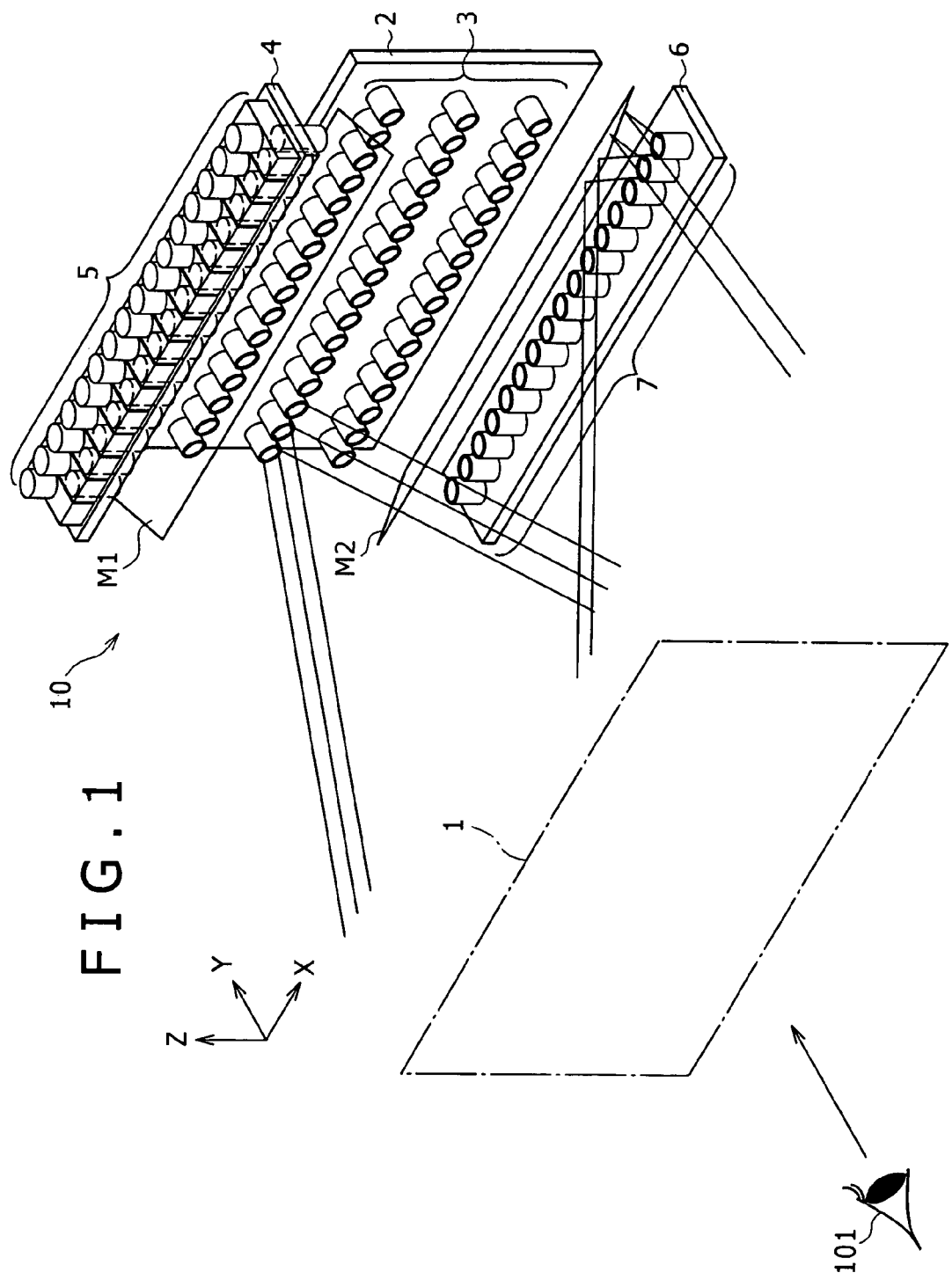
FIG. 1 is a perspective view showing a general configuration of a stereoscopic image display apparatus according to an embodiment of the present invention.
Figure 2:
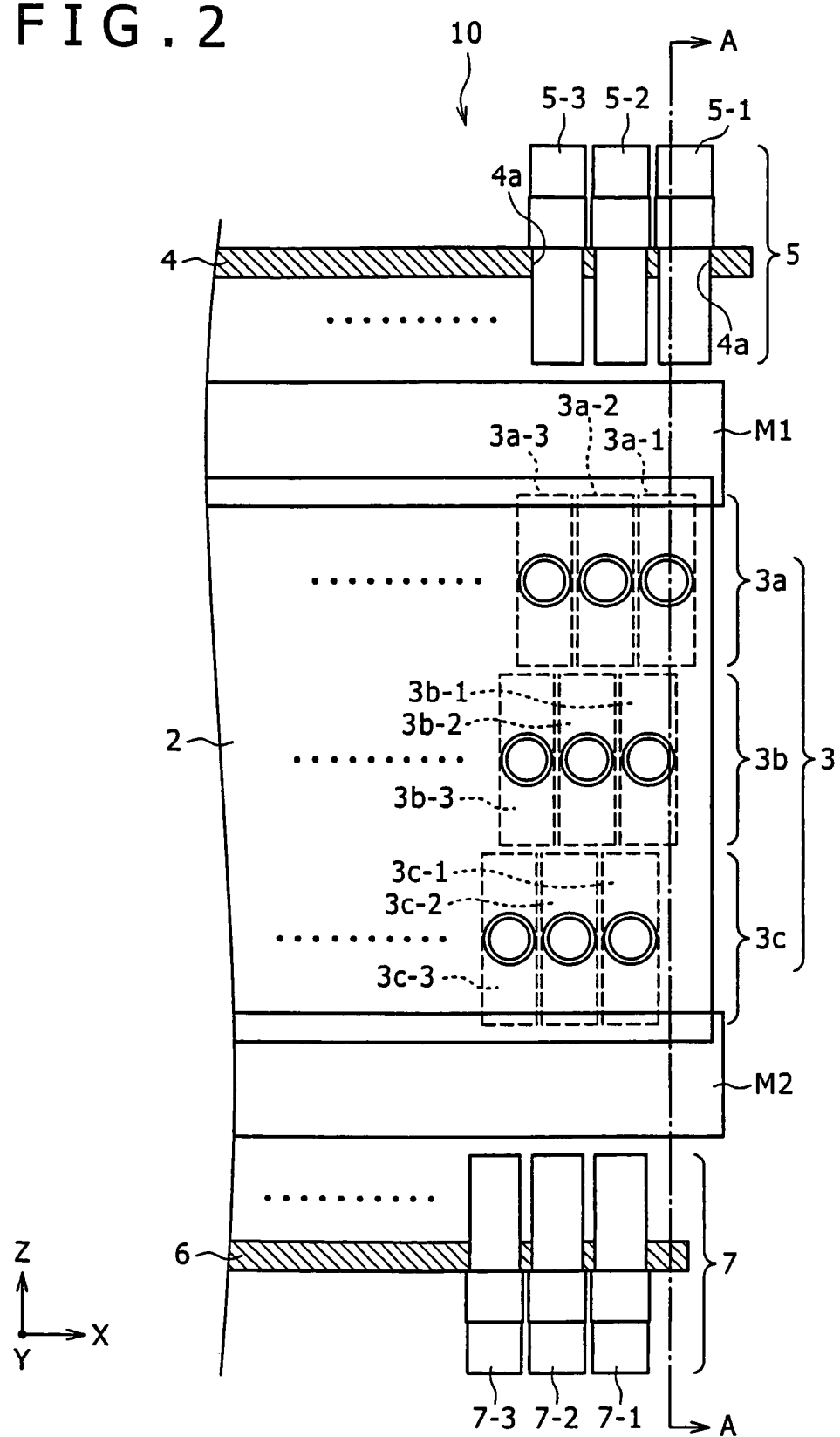
FIG. 2 is a front elevational view showing part of the stereoscopic image display apparatus of FIG. 1.
Figure 3:
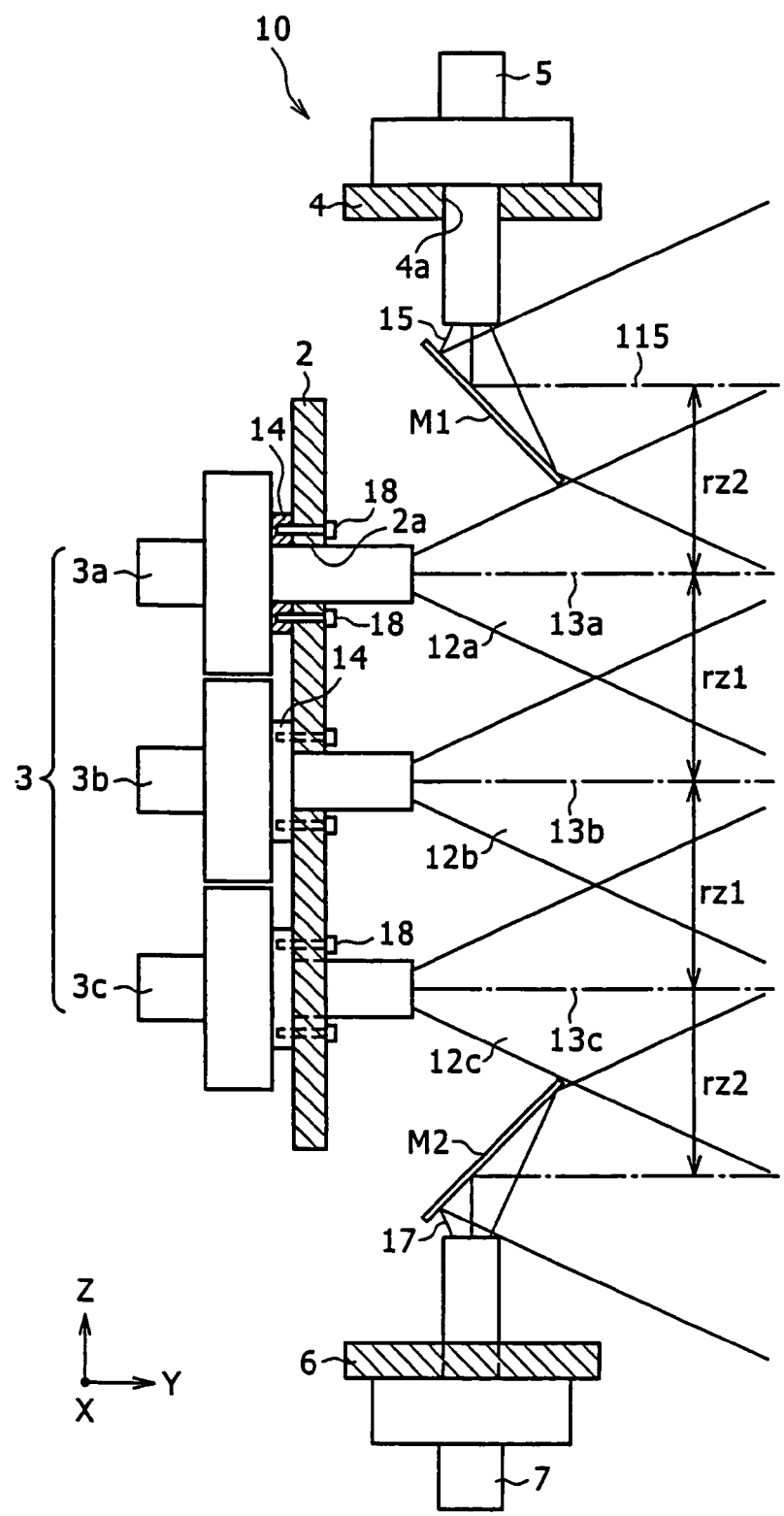
FIG. 3 is a sectional view taken along line A-A of FIG. 2.

FIGS. 1 to 3 show a general configuration of a stereoscopic image display apparatus according to a preferred embodiment of the present invention.

The stereoscopic image display apparatus 10 shown includes a first projection element group 3 for projecting images from the front, and a second projection element group 5 and a third projection element group 7 disposed above and below the first projection element group 3, respectively. The first projection element group 3 includes a plurality of projection elements 3 inserted individually in holes 2a (refer to FIG. 3) provided, for example, in a suitable base member 2. The base member 2 is made of wood, metal, resin, or the like although the material is not limited to a particular one.

Referring to FIG. 2, in the first projection element group 3, the projection elements 3 are arranged in three rows in the heightwise direction (Z direction) as denoted by reference characters 3a, 3b, and 3c and arranged in a large number of columns, for example, 16 columns, in a horizontal direction (X direction) as denoted by reference characters 3a-1, 3a-2, 3a-3, . . . . In short, totaling 48 projection elements 3 are mounted on the base member 2. However, in the first projection element group 3, the number of projection elements 3 is not limited to the specific number, and preferably, a number of projection elements 3 as great as possible are provided in both of the X and Z directions in order to implement an image of high picture quality. A spacer 14 is disposed between each of the projection elements in the first projection element group 3 and, for example, the base member 2 as seen in FIG. 3 to make it possible to finely adjust the projection distance of the corresponding first group projection element 3 by means of, for example, screws 18. However, such an adjustment mechanism which uses the spacer 14 as just described need not be provided as seen from the second group projection elements 5 or the third group projection elements 7 shown in FIG. 2, but the projection elements 3 may be inserted in and secured to the holes 2a of the base member 2. It is to be noted that the adjustment mechanism which uses the spacer 14 or the like may be provided also for the second group projection elements 5.

Since images having parallaxes from each other are projected from the projection elements 3 having such a configuration as described above, an observer 101 can recognize the projected images as a stereoscopic image. In the present embodiment, for example, a light beam reproduction method is used as a technique for providing stereoscopic display. In the light beam reproduction method, light fluxes which are to form a stereoscopic image are introduced into the eyes of the observer 101, or light fluxes of a stereoscopic image are created in a space. Accordingly, although a screen 1 may be present, it may not be necessary.

One of techniques of the light beam reproduction method is described. Although further description is hereinafter described, for example, a plurality of cameras not shown are used as an image pickup system, and an image pickup range to be taken charge of is set for each of the cameras. Consequently, images picked up by the cameras and having parallaxes therebetween are prepared. Then, angles of the parallaxes, relating refractive indices, and so forth are calculated, and the images are worked based on results of the calculation. Then, the images obtained by the working process are synthesized to produce one stereoscopic image frame. In the present embodiment, images picked up by the cameras and then processed are displayed by the projection elements 3, 5, and 7 disposed so as to correspond to the plurality of cameras described above so that a stereoscopic image can be displayed. This is so called multi lens system. Accordingly, as the number of projection elements increase, more pixels are obtained. Thus, a stereoscopic image having higher picture quality can be produced.

In this instance, the number of cameras is not equal to the number of projection elements and may be, for example, smaller than the number of projection elements. An image of an image pickup object which can be observed from between two cameras from an angle in which an image is not actually picked up is processed such as interpolation. Consequently, an image from an angle from which an image is not actually picked up can be provided.

The second projection element group 5 is formed such that, for example, 16 projection elements 5 are disposed in a horizontal direction and inserted individually in holes 4a of a base member 4 similarly to the projection elements of the first projection element group 3. As seen in FIGS. 1 and 2, in a direction (Y direction) from the first group projection elements 3 toward the screen 1 or the observer 101, the projection elements 5-1, 5-2, 5-3, . . . are arranged in a row. The projection elements 5-1, 5-2, 5-3, . . . are mounted on the suitable base member 4 similarly to the projection elements of the first projection element group 3, and the base member 4 is disposed substantially perpendicularly to the base member 2. In particular, the projection elements of the first projection element group 3 and the projection elements of the second projection element group 5 are disposed such that light fluxes 15 projected from the projection elements of the second projection element group 5 may be directed (Z direction) toward light fluxes 12a, 12b, and 12c projected from the projection elements 3. In the present embodiment, the first group projection elements 3 and the second group projection elements 5 are disposed such that the optical axes of the first group projection elements 3 and the second group projection elements 5 may be substantially perpendicular to each other in a state that a mirror M1 (hereinafter described) is not disposed. Where the direction of the light fluxes 15 is set so as to be directed toward the light fluxes 12a, 12b, and 12c, the light paths can be disposed densely when compared with the configuration shown in FIG. 9 of Patent Document 2 mentioned hereinabove that a mirror is provided at an end portion of the apparatus. Consequently, miniaturization of the stereoscopic image display apparatus 10 can be implemented.

Further, the light path length (hereinafter described) of the light fluxes 15 projected from the projection elements 5 substantially coincides with the light path length of the light fluxes 12a to 12c projected from the projection elements 3.

The third projection element group 7 has a configuration substantially similar to that of the second projection element group 5. In particular, the third projection element group 7 includes projection elements 7-1, 7-2, 7-3, . . . disposed in a horizontal row on a base member 6 and is disposed in an opposing relationship to the second projection element group 5 such that the optical axes 13a, 13b, 13c, . . . of light fluxes of the first group projection elements 3 may be disposed therebetween. In other words, the projection direction of the light fluxes 17 from the third group projection elements 7 is the Z direction.

The base members 2, 4, and 6 are secured to respective frames or the like not shown by means of screws, adhesion, welding, or some other technique. Further, where the screen 1 is provided, the screen 1 is secured to a frame or the like not shown.

Mirrors M1 and M2 are disposed in the proximity of the second projection element group 5 and the third projection element group 7, respectively. The mirror M1 is disposed in such a manner as to reflect the light fluxes 15 projected from the projection elements 5-1, 5-2, . . . by a reflection angle of 90°. Consequently, the light fluxes 15 are projected toward the screen 1 or the observer 101. Also the mirror M2 reflects the light fluxes 17 of the projection elements 7-1, 7-2, . . . so as to be directed to the screen 1 similarly to the mirror M1. The mirrors M1 and M2 have a reflection factor of approximately 100%. Accordingly, the mirrors M1 and M2 are disposed at positions at which they do not intercept the light fluxes 12a to 12c from the first group projection elements 3.

In the following description, where it is intended to represent one projection element without distinction among the first, second, and third group projection elements 3, 5, and 7, it is referred to as projection element 50.

Figure 4:
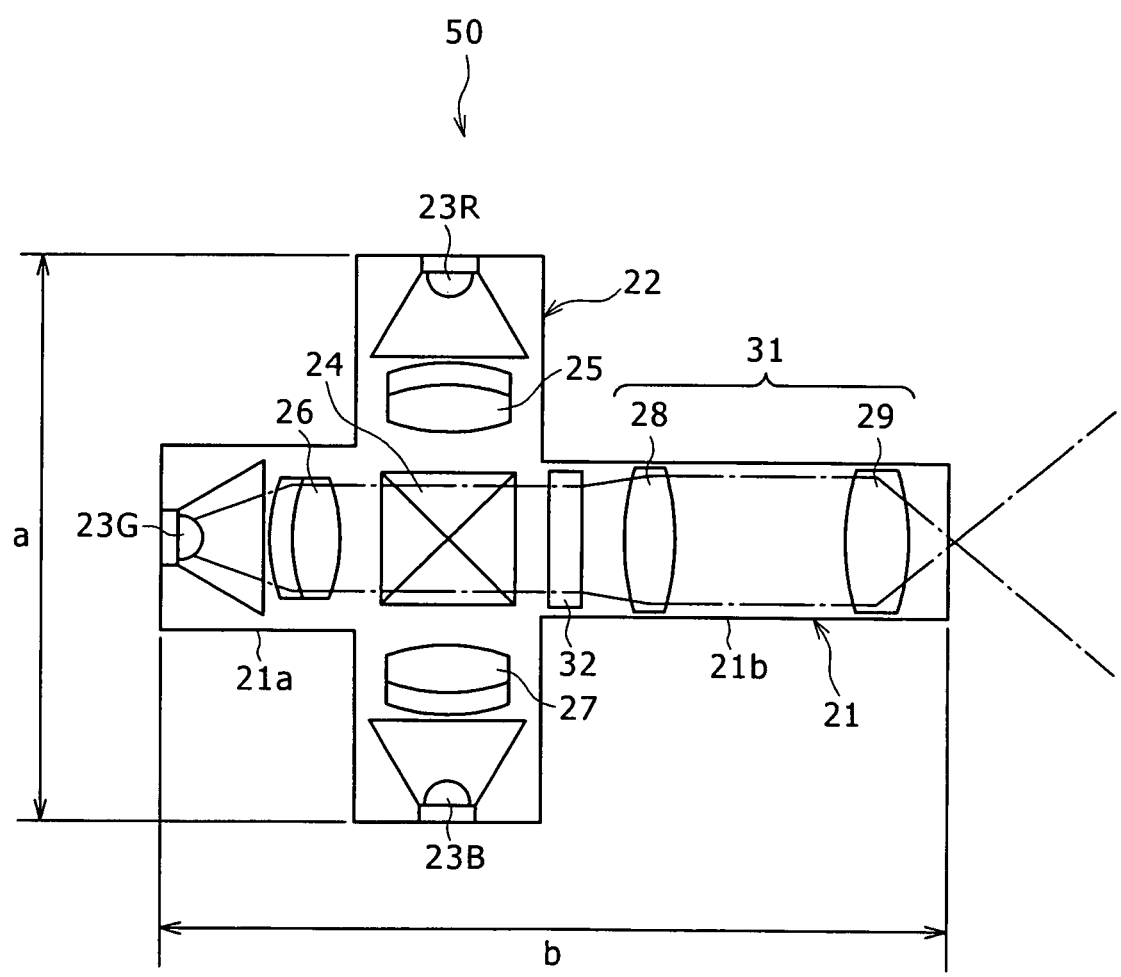
FIG. 4 is a schematic view showing a general configuration of an internal structure of individual projection elements used in the stereoscopic image display apparatus of FIG. 1.

FIG. 4 shows a general configuration of an internal structure of each projection element 50. Referring to FIG. 4, the projection element 50 shown includes a tubular member 21 having, for example, a cylindrical shape, and a box member (housing) 22 having a shape of a rectangular parallelepiped. Lamps, optical systems and so forth are built in the tubular member 21 and the box member 22. The tubular member 21 has a rear tubular member 21a and a front tubular member 21b. The box member 22 exhibits a maximum dimension in the vertical direction in FIG. 4, and the length "a" of the same is, for example, 30 to 80 mm. The length "b" of the tubular member 21 in the horizontal direction is 40 to 150 mm. However, the lengths "a" and "b" are not limited to such specific values as given above but may be set suitably.

The box member 22 has built therein an LED (Light Emitting Diode) 23R for emitting light of a red color and another LED 23B for emitting light of a blue color. A further LED 23G for emitting light of a green color is built in the rear tubular member 21a. The projection element 50 further includes light condensing lens systems 25, 26, and 27 for condensing light emitted from the LEDs 23R, 23G, and 23B, respectively, and a prism 24 for introducing the light fluxes condensed by the LEDs 23R, 23G, and 23B toward the front tubular member 21b. The projection element 50 further includes a modulation element 32 for modulating the light emitted from the prism 24 to produce an image, and a projection lens system 31 for projecting the image light produced by the modulation element 32. The modulation element 32 may be formed, for example, from a liquid crystal element of the transmission type. The projection lens system 31 includes, for example, a collimator lens 28, a diffusion lens 29, and so forth.

It is to be noted that the light path length signifies the distance on the optical axis (that is, on the main light flux which passes the center of the projection lens system 31 of the projection element 50) over which light projected from the projection element 50 reaches the screen 1 or the observer 101.

For the system for image projection of the projection element 50, for example, a field sequential system is used. The field sequential system is used to produce images time-divisionally. For example, in the projection element 50, images of R, G, and B (red, green, and blue) are produced after every unit interval of time, and an image frame is formed from three such images. In other words, the LEDs 23R, 23G, and 23B are turned on after every unit interval of time, and driving of the modulation element 32 is controlled so as to be synchronized in a period of time equal with an integral number of times of the timings. Although the unit interval of time corresponds, for example, 40 to 80 Hz, it may otherwise be longer or shorter than that corresponding to 40 to 80 Hz. Where such a field sequential method as described above is used, only one modulation element 32 may be used. Therefore, miniaturization of the projection element 50 can be anticipated. If miniaturization of the projection element 50 can be implemented, then since such projection elements 50 can be juxtaposed densely, a natural image of high picture quality and high definition can be produced.

The field sequential system need not necessarily be used, but otherwise, for example, three liquid crystal elements for each of R, G, and B may be provided. In this instance, although the structure of the projection elements is complicated, there is an advantage that enhanced brightness can be obtained.

As seen in FIG. 2, in the first projection element group 3, the projection elements 3a-1, 3a-2, . . . , projection elements 3b-1, 3b-2, . . . , and projection elements 3c-1, 3c-2, . . . are disposed in a displaced relationship from each other in the X direction. In other words, the projection elements 3 are disposed in a zigzag pattern or diagonally. The reason why the projection elements 3 are disposed in this manner is described below.

Figure 5A:
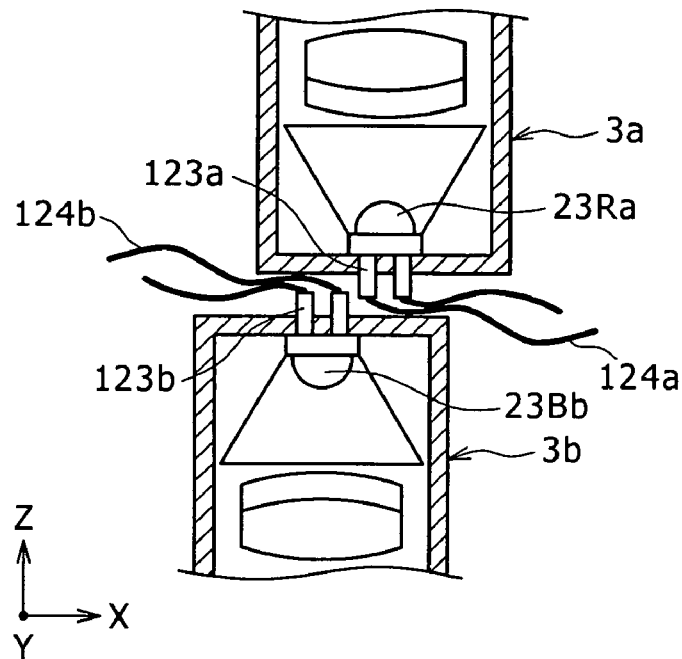
FIGS. 5A and 5B are enlarged sectional views illustrating an example of an array state of first projection elements in the stereoscopic image display apparatus of FIG. 1.
Figure 5B:
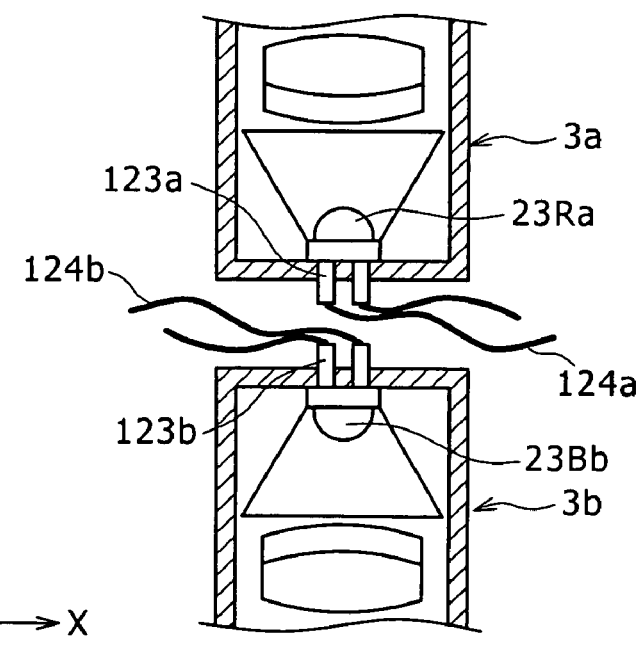

FIGS. 5A and 5B show projection elements of the first group projection elements 3 in an enlarged scale. As shown in FIG. 5A, for example, the LED 23Ra of the projection element 3a and the LED 23Bb of the projection element 3b have electrode terminals 123a and 123b, respectively. Electrode cables 124a and 124b are connected to the terminals 123a and 123b, respectively. It is necessary to prevent the terminals 123a and 123b from contacting or interfering with each other. Accordingly, in the case of the projection element which has the box member 22 having the maximum length "a" (refer to FIG. 4) in the Z-X plane, the terminals 123a and 123b should be disposed in a displaced relationship from each other in a direction (X direction) perpendicular to the direction (Z direction) of the length "a". By the disposition just described, the projection elements can be disposed densely when compared with those in an ordinary state (in a state that the projection elements are not disposed in a displaced relationship from each other) as seen in FIG. 5B.

Figure 6:
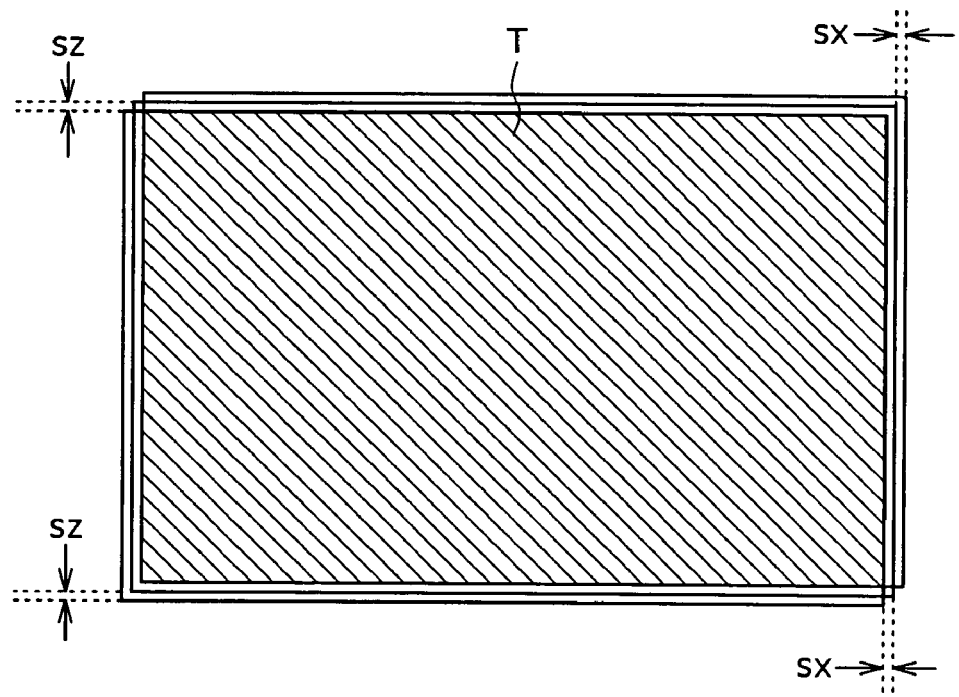
FIG. 6 is a schematic view showing an image displayed on a screen from only three projection elements in a Z direction in a first projection element group.

An image displayed on the screen 1, for example, only by three projection elements 3a-1, 3b-1, and 3c-1 in the Z direction in the first projection element group 3, or an image for the observer 101, is such as shown in FIG. 6. For example, the pitch sz of images shown in FIG. 6 decreases as the pitch in the Z direction decreases as seen in FIG. 5A. A portion of the images which is used actually as a stereoscopic image is a portion denoted by T and indicated by slanting lines over which the three images overlap with each other. Further, also the image pitch sx in the X direction decreases as the pitch of the projection elements 3a-1, 3a-2, . . . in the X direction decreases.

Figure 7:
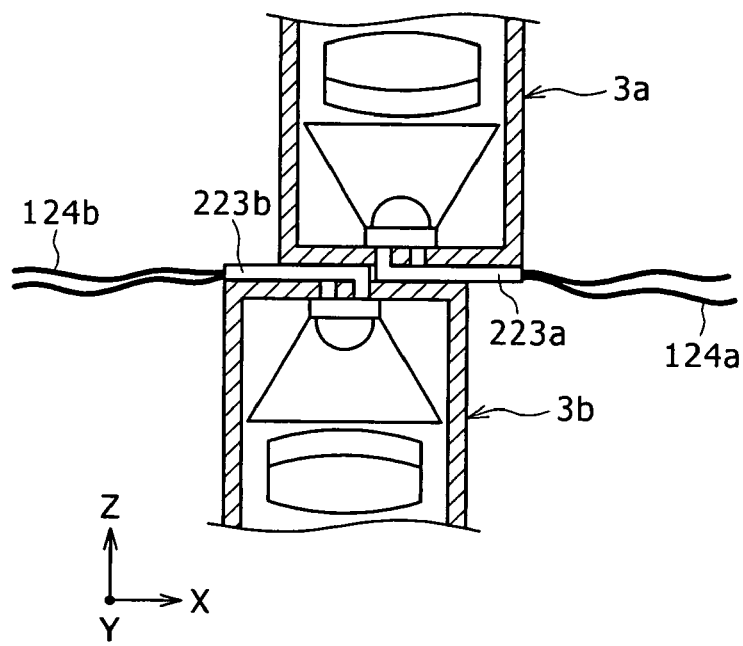
FIGS. 7 and 8 are enlarged sectional views illustrating different examples of the array state of the first projection elements in the stereoscopic image display apparatus of FIG. 1.

If terminals 223a and 223b of LEDs are bent and extend in the Y direction as seen in FIG. 7, then the projection elements are disposed more densely. It is to be noted that, although, for example, two terminals 223a (or 223b) are disposed in the Y direction in FIG. 7, only one terminal 223a can be seen in FIG. 7.

Figure 8:
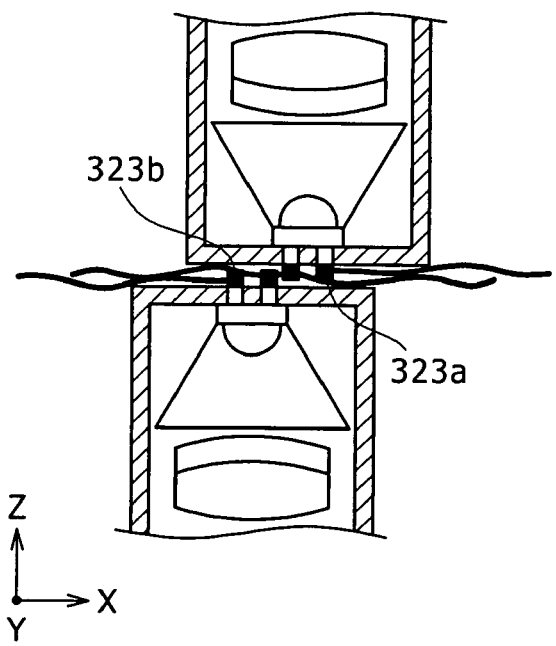

Terminals 323a and 323b of LEDs shown in FIG. 8 are each formed such that it is coated at a conductive portion thereof with an insulator. With such a configuration as just described, there is no problem even if the terminals 323a and 323b contact with each other. Therefore, the projection elements can be disposed densely.

Figure 9:
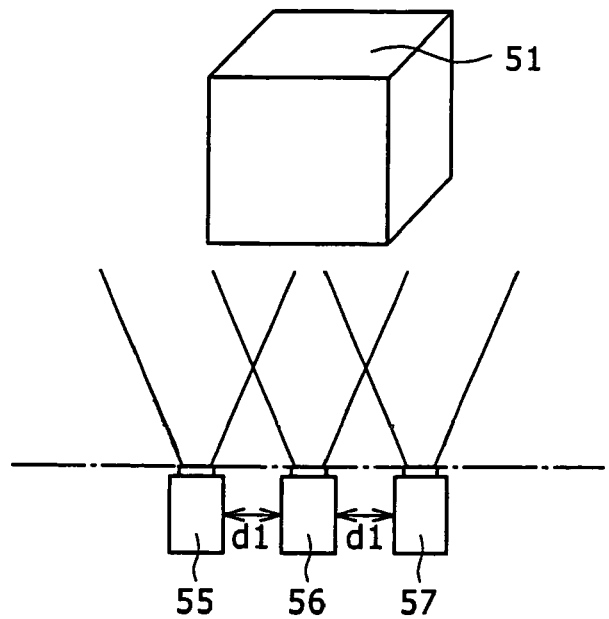
FIGS. 9 and 10 are schematic views showing different examples of arrangement of cameras where images to be displayed by the stereoscopic image display apparatus of FIG. 1 are picked up.
Figure 10:
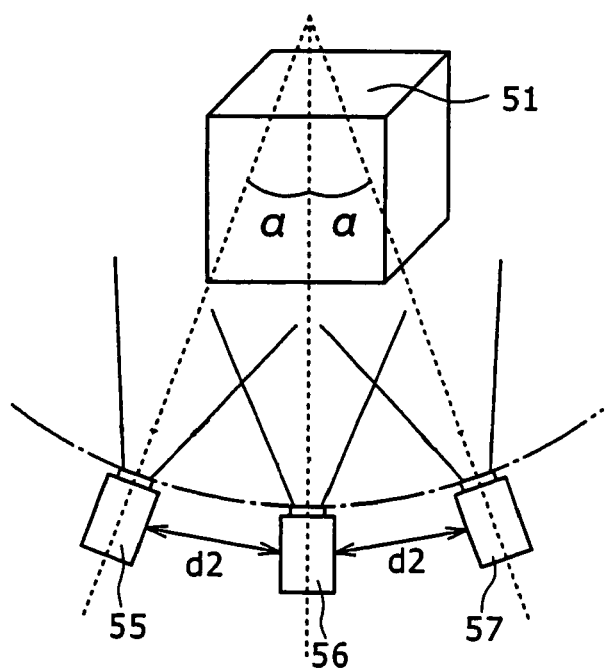

FIGS. 9 and 10 show different arrangements of cameras where images to be displayed by the stereoscopic image display apparatus 10 are picked up. FIG. 9 shows an example that digital video cameras 55, 56, and 57 are arrayed in a spaced relationship from each other by a distance d1 on a straight line (one-dimensionally) and directed to an image pickup subject 51. FIG. 10 shows another example that cameras 55 to 57 are arrayed in a spaced relationship from each other, for example, by an angle α and a distance d2 along a curved line. In order to obtain a stereoscopic image, a plurality of images are picked up from different points of view in this manner. It is to be noted that the arrangement of cameras is not limited to such specific ones as described above with reference to FIGS. 9 and 10, but the number of cameras may be increased and disposed on a flat plane (two-dimensionally) or on a curved plane. Cameras may be disposed three-dimensionally. Further, the distances between the cameras 55 to 57 may not be equal to each other but may be different from each other.

Figure 11:
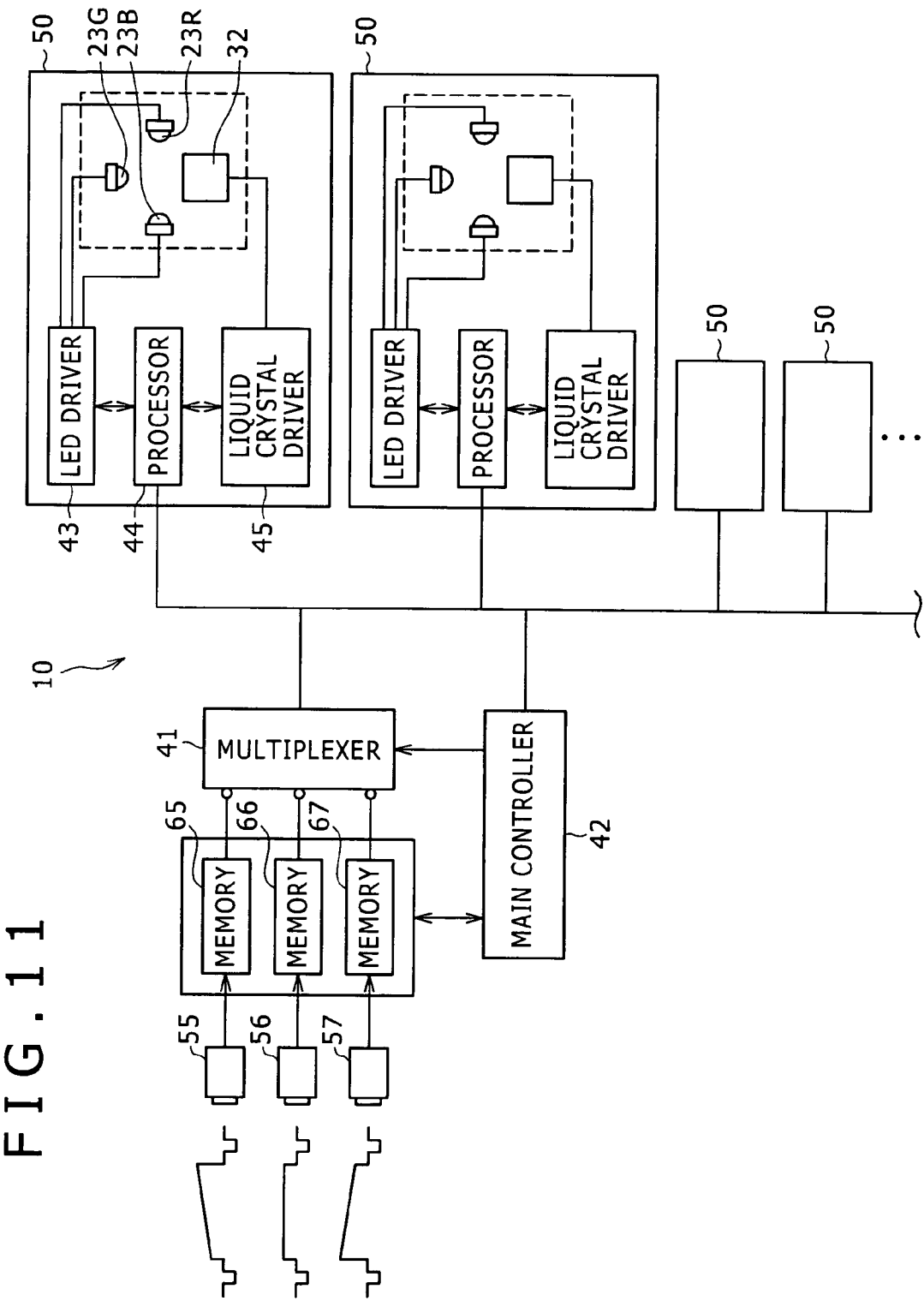
FIG. 11 is a block diagram showing a configuration of a control system of the stereoscopic image display apparatus of FIG. 1.

FIG. 11 shows a configuration of a control system of the stereoscopic image display apparatus 10.

Here, description is given of a case that a liquid crystal element is used as the modulation element 32.

Referring to FIG. 11, the stereoscopic image display apparatus 10 includes memories 65 to 67, a multiplexer 41, and a main controller 42. Projection elements 50 are electrically connected to the main controller 42. Each of the projection elements 50 includes a modulation element 32 mentioned hereinabove, a liquid crystal driver 45 for driving the modulation element 32, LEDs 23R, 23G, and 23B, an LED driver 43 for driving the LEDs 23R, 23G, and 23B, a processor 44 for controlling the LED driver 43 and the liquid crystal driver 45, and so forth. It is to be noted that the processor 44, liquid crystal driver 45, LED driver 43 and so forth need not necessarily be incorporated in the body of the projection element 50 but may be provided in a different unit. Each of the projection elements 50 need not include the processor 44 but all of the projection elements 50 may be controlled, for example, by a single main controller 42.

The memories 65 to 67 store data of image frames picked up by the cameras 55 to 57, respectively. The multiplexer 41 performs an image process and a synthesis process based on the data of the image frames stored in the memories 65 to 67. In particular, the multiplexer 41 produces an image frame from images obtained by the cameras 55 to 57 based on the angle θ of view, distances d1 and d2, angle α, focal depth of the cameras, and so forth illustrated in FIGS. 7, 8, and so forth depending upon a conversion table not shown.

The main controller 42 controls memory areas and data inputting/outputting timings of the memories 65, 66, and 67 and outputting of image frame data from the multiplexer 41 to the processors 44, and so forth.

In the stereoscopic image display apparatus 10 having such a configuration as described above, since the projection elements 50 successively project image frames having parallaxes from each other in a synchronized relationship with each other, a stereoscopic moving picture by light beam reproduction can be displayed. Further, it is a matter of course that not only a moving picture but also a still picture can be displayed.

As described above, the stereoscopic image display apparatus 10 according to an embodiment of the present embodiment uses the mirrors M1 and M2 to reflect the light fluxes 15 of the second group projection elements 5 toward the screen 1 or the observer 101. The reason is that, since the reduction of individual projection elements themselves is limited, where the mirrors M1 and M2 are used to reflect light so that the light is used for display, the image pitch by the projection elements 3, 5, and 7 displayed on the screen 1 or observed by the eyes of the observer 101 can be minimized. Such action and effects are described in more detail.

In the present embodiment, the light path length of the light fluxes 12a to 12c and the light path length of the light fluxes 15 (or light fluxes 17) are set equal to each other. Consequently, it seems as if the light fluxes 15 were projected in a direction same as that of the light fluxes from the first group projection elements 3. Therefore, the necessity for correction of image data by the second group projection elements 5, image processing, and so forth to make the projection distance of the light fluxes 15 equal to that of the image light fluxes from the first group projection elements 3 is eliminated. The necessity to provide the projection elements of the second group projection elements 5 with an optical system and so forth of a configuration different from that of the projection elements of the first group projection elements 3 so that the projection distance of the image light fluxes from the second group projection elements 5 may become equal to that of the image light fluxes from the first group projection elements 3 is eliminated as well. Here, the projection distance signifies a distance from the diffusion lens 29 of a projection element to the screen 1 or the eyes of the observer 101. Consequently, it is possible to form the optical systems and so forth of all of the projection elements so as to have the same configuration. Therefore, the productivity of the stereoscopic image display apparatus 10 is enhanced.

Further, although the light fluxes 15 (or light fluxes 17) are projected as if they were projected in the same direction as the light fluxes from the first group of first group projection elements 3, the image pitch or the pitch of the optical axes can be reduced when compared with that in an alternative case that light fluxes are actually projected in the same direction as those from the first group projection elements 3, second group projection elements 5, and so forth.

More particularly, the pitch of the projection elements 3a, 3b, and 3c of the first group projection elements 3 in the Z direction is denoted by rz1 as seen in FIG. 3. In particular, the distance between the optical axes 13a, 13b, and 13c is rz1. Meanwhile, the distance between the optical axis 115 of each one of the projection elements of the second projection element group 5 and the optical axis 13a of the projection element 3a which is next to the projection element 5 in the Z direction is represented by rz2. In the example shown in FIG. 3, the distances rz1 and rz2 are set so as to satisfy rz1>rz2. By the configuration just described, a stereoscopic image of high picture quality and high definition can be displayed.

With the stereoscopic image display apparatus 10 according to an embodiment of the present embodiment, since the projection elements are juxtaposed densely, the pitch of the optical axes is small. Therefore, a stereoscopic image which is natural and deep and difficult to be achieved by a stereoscopic image display apparatus of the lenticular system, the parallax barrier system, or the like can be displayed. Consequently, the observer can observe a stereoscopic image which looks natural in whichever direction the observer observes the same within a region that image light fluxes from the projection elements 50 overlap with each other.

Figure 12:
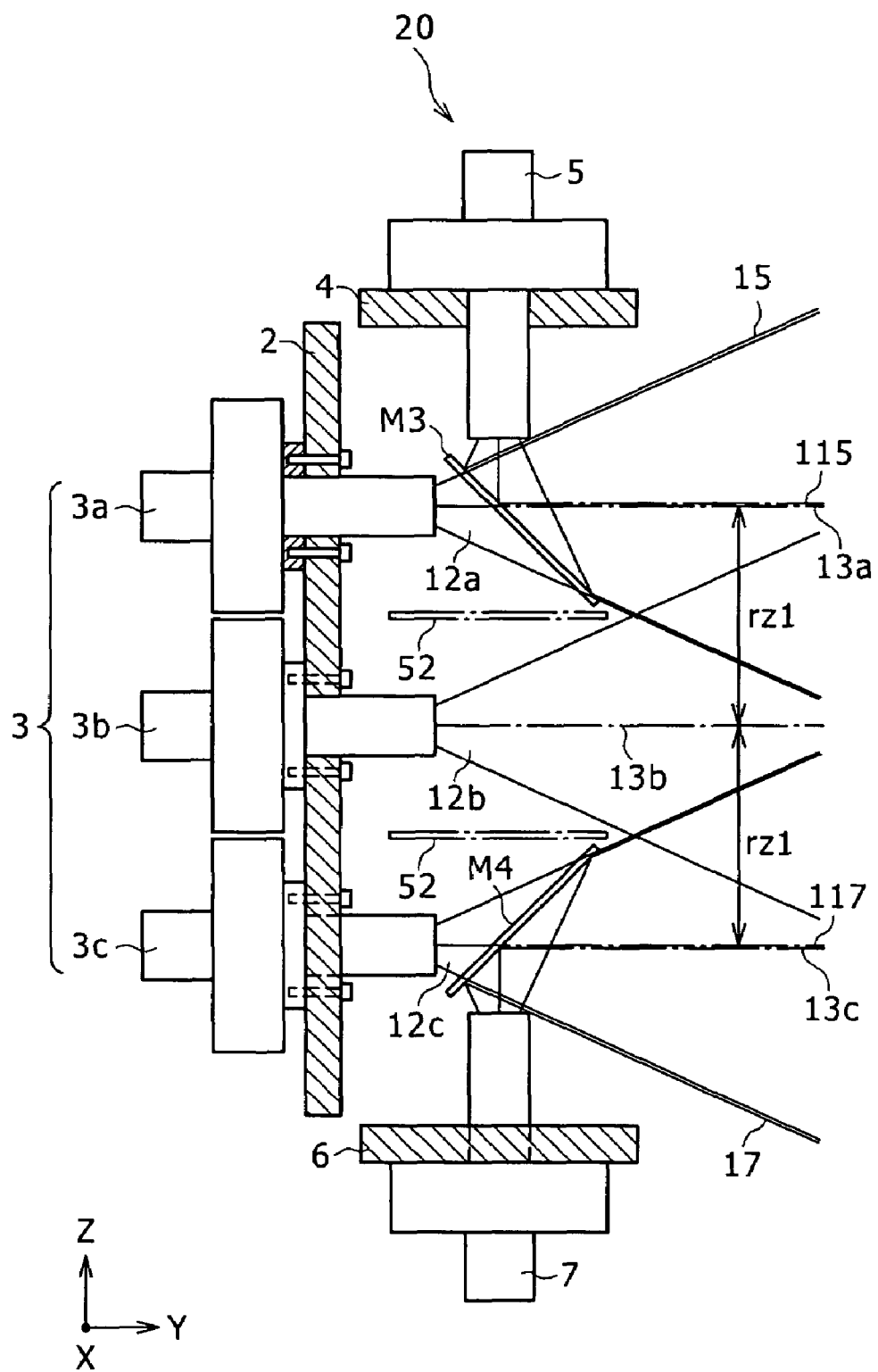
FIG. 12 is a schematic side elevational sectional view showing part of a stereoscopic image display apparatus to another embodiment of the present invention.

FIG. 12 is a side elevational view showing part of a stereoscopic image display apparatus according to another embodiment of the present invention. The stereoscopic image display apparatus of the present second embodiment has a configuration similar to that of the stereoscopic image display apparatus according to the first embodiment described hereinabove. Thus, only differences of the stereoscopic image display apparatus of the present embodiment from the stereoscopic image display apparatus of the first embodiment are described below.

Referring to FIG. 12, in the stereoscopic image display apparatus 20 shown, mirrors M3 and M4 are disposed such that the light paths of projection light fluxes 12a (12a-1, 12a-2, ... in FIG. 2) of projection elements 3a (3a-1, 3a-2, ...) of the first group projection elements 3 and projection light fluxes (15-1, 15-2, ... ) of projection elements 5 (5-1, 5-2, ... ) of the second projection element group 5 may overlap with each other. For example, a half mirror or the like is used for the mirrors M3 and M4. The mirrors M3 and M4 allow the light fluxes 12a to 12c from the first group projection elements 3 to pass therethrough but reflect (for example, totally reflect) the light fluxes 15 and 17 from the second group projection elements 5 and the third group projection elements 7, respectively. The reflection angle is set substantially to the right angle.

The transmission factor of the mirrors M3 and M4 may have any value and is set suitably. Where the mirrors M3 and M4 are each formed from a half mirror which allows a light flux from any direction to pass therethrough, a baffle 52 may be disposed as seen in FIG. 12. However, it is a matter of course that the baffle 52 may not be disposed.

In the stereoscopic image display apparatus 20 having such a configuration as described above, the light paths, for example, of the first group projection elements 3 and the second group projection elements 5 substantially coincide with each other, and the optical axes 13a and the optical axes 115 substantially coincide with each other. In other words, although the distance rz1 is same as that in FIG. 3, the distance rz2 shown in FIG. 3 is almost zero in FIG. 12. Accordingly, the limitation to the angle at which the observer 101 looks at the stereoscopic image is moderated, and a spectral image which looks more natural can be displayed.

In the stereoscopic image display apparatus 20 of the present embodiment, since the light path lengths of the first, second, and third group projection elements 3, 5, and 7 are substantially equal to each other similarly as in the stereoscopic image display apparatus 10 described hereinabove, advantages similar to those of the stereoscopic image display apparatus 10 can be anticipated. Further, the stereoscopic image display apparatus 20 can be formed with a size in the Z direction smaller than that of the stereoscopic image display apparatus 10. Consequently, further miniaturization of the apparatus can be anticipated.

In the stereoscopic image display apparatus 20, the mirrors M3 and M4 are used. Accordingly, where the light amounts of all of the projection elements 3, 5, and 7 (LEDs 23R, 23G, and 23B in FIG. 4) are equal, the following situation occurs. In particular, the light amount of the projection element 3a and the projection element 3c of the first projection element group 3 after the light fluxes pass through the mirrors M3 and M4 is hereinafter referred to as first light amount. The light amount of the second group projection element 5 and the third group projection element 7 after they are totally reflected by the mirrors M3 and M4 (or the light amount of a projected light flux from the projection element 3b) is hereinafter referred to as second light amount. The first light amount and the second light amount are different from each other. Accordingly, the light amounts of the individual light sources should be set so that the light amounts to be finally used for display may be equal to each other. In this instance, the light amounts of the light source should be set such that the second light amount is smaller than the first light amount.

Further, where the mirrors M3 and M4 are half mirrors which allow light from any direction to pass therethrough (for example, allow a light flux from any direction to pass therethrough with an equal transmission factor), the light amount of the light source for the projection element 3b and the light amounts of the light sources of the other projection elements 5, 3a, and 3c may be set suitably.

Not the light amounts of the light sources but the transmission factors of the modulation elements 32 of the projection elements 3, 5, and 7 may be set suitably so that the light amounts to be finally used for display may be equal to each other.

The present invention is not limited to the embodiments described above but allows various modifications.

For example, in the embodiments described above, the second projection element group 5 and the third projection element group 7 are disposed at upper and lower locations, respectively. However, in addition to such upper and lower projection element groups, a further projection element group (at least one of fourth and fifth projection element groups) may be disposed sidewardly (leftwardly or rightwardly). The second projection element group 5 and the third projection element group 7 may be disposed only leftwardly and rightwardly without being disposed at upper and lower locations.

At least one of the first projection element group 3, second projection element group 5, third projection element group 7, and fourth and fifth projection element groups described above may be formed on a curved plane. At least two groups from among the first, second, third, fourth, and fifth projection element groups may be disposed such that they are not distinguished from each other and are continuously connected to each other along a curved plane.

The configuration of the projection element 50 shown in FIG. 4 is a mere example and can be modified suitably. In this instance, preferably the projection element groups are formed in such a shape or a size or formed from such a material or the like that the projection elements can be laid as densely as possible. Further, the modulation element 32 built in each projection element 50 described above is formed as a liquid crystal element of the transmission type. However, also a liquid crystal element of the reflection type or a modulation element such as a DMD (Digital Micromirror Device) element can be used. In this instance, the arrangement of the light sources or the lens systems is suitably changed.

Further, in the embodiments described hereinabove, the mirrors M1 to M4 are disposed such that they make an angle of 45° with respect to the first group projection elements 3 and the second group projection elements 5 (third group projection elements 7). However, the angle may otherwise be greater than 45° or smaller than 45°. Where the angle is not 45° in this manner, the image, for example, displayed on the screen 1 suffers from trapezoidal distortion. In this instance, a method of correcting such trapezoidal distortion on image data or another method of correcting such trapezoidal distortion through an optical system such as a lens can be applied as a countermeasure.

Figure 13:
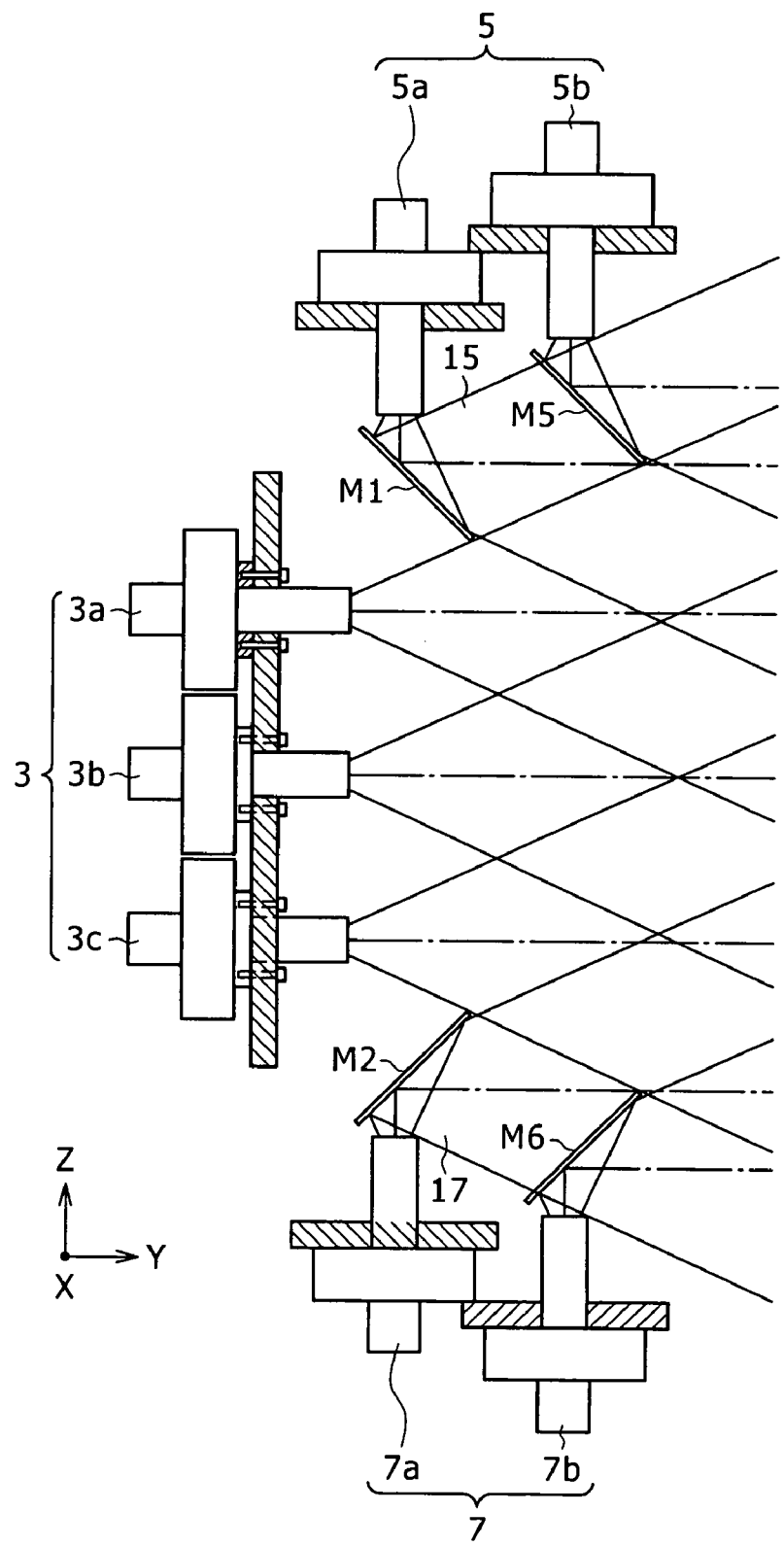
FIG. 13 is a schematic side elevational sectional view showing a modified stereoscopic image display apparatus which includes a plurality of rows of projection elements of a second or third projection element group.

The stereoscopic image display apparatus 10 and 20 described hereinabove are configured such that the projection elements of each of the second projection element group 5 and the third projection element group 7 are disposed in only one row in the X direction. However, the projection elements may be disposed in a plurality of rows in the Y direction as seen in FIG. 13. In particular, the second group projection elements 5 may be disposed in a plurality of groups in the Y direction as denoted by 5a and 5b in FIG. 13. Similarly, the third group projection elements 7 may be disposed in a plurality of groups in the Y direction as denoted by 7a and 7b in FIG. 13. In this instance, it is necessary to use a half mirror for mirrors M5 and M6 for reflecting projected light fluxes from the projection elements 5b and 7b in the second row. This is intended to allow projection light fluxes 15 and 17 from the projection elements 5a and 7a to pass through the mirrors M5 and M6, respectively.

The angle of view of the projection lens systems 31 of the projection elements in the embodiments described above is not limited to that illustrated in FIGS. 3, 12, and so forth, but a lens which provides a different greater angle of view may be used.

It should be understood that by those skilled in the art that various modifications, combinations, sub-combinations, and alternations may occur depending on designs and other factors insofar as they are within the scope of the appended claims or the equivalent thereof.

What is claimed is:

1. A stereoscopic image display apparatus, comprising:
a first projection element group including a plurality of first projection elements operable to project first light fluxes along and about respective ones of first light flux axes in a first direction;
a second projection element group including a plurality of second projection elements operable to project second light fluxes along and about respective ones of second light flux axes in a second direction which is different from the first direction and in which respective ones of the second light fluxes are directed to respective ones of the first light fluxes; and
a reflecting optical system operable to reflect the second light fluxes in the first direction,
wherein, prior to the reflecting optical system reflecting the second light fluxes, respective ones of the first light flux axes and respective ones of the second light flux axes are oriented at least generally perpendicularly to one another and, after the reflecting optical system reflects the second light fluxes, respective ones of the first light flux axes and respective ones of the second light flux axes extend at least generally parallel to one another and
wherein each one of the plurality of first projection elements and the plurality of second projection elements includes a projection lens assembly, a four-sided prism having a first side, a second side, a third side and a fourth side, a red light-emitting diode assembly directing red light onto the first side and into the prism, a blue light-emitting diode assembly directing blue light onto the second side and into the prism and a green light-emitting diode assembly directing green light onto the third side and into the prism so that light emitted by the red, blue and green light-emitting diode assemblies is projected from the fourth side of the prism and through the projection lens assembly.

2. The stereoscopic image display apparatus according to claim 1,
wherein the first light fluxes have a first light path length, and the second light fluxes have a second light path length substantially equal to the first light path length.

3. The stereoscopic image display apparatus according to claim 1,
wherein said first and second projection elements are disposed such that the distance between first optical axes of the first light fluxes and second optical axes of those of the second light fluxes which are nearest to the first optical axes is smaller than the distance between the first optical axes.

4. The stereoscopic image display apparatus according to claim 1,
wherein said reflecting optical system includes a mirror disposed at a position at which said mirror does not intercept the first light fluxes.

5. The stereoscopic image display apparatus according to claim 1,
wherein the first direction and the second direction substantially make the right angle, and the reflecting angle of the second light fluxes by said reflecting optical system is approximately 45°.

6. The stereoscopic image display apparatus according to claim 1, further comprising a third projection element group disposed in an opposing relationship to said second projection light element group across the optical axis of the first light fluxes.

7. The stereoscopic image display apparatus according to claim 1,
wherein each of said first projection elements includes a plurality of light sources operable to allow an image to be displayed as a color image.

8. The stereoscopic image display apparatus according to claim 7,
wherein each of said first projection elements has a housing which has a dimension greatest in a third direction within a plane substantially perpendicular to the first direction, and said first projection elements are disposed in a displaced relationship in a direction substantially perpendicular to the third direction in the plane.

9. The stereoscopic image display apparatus according to claim 1,
wherein each one of the plurality of first projection elements and the plurality of second projection elements includes a substantially cross-shaped housing having a central housing portion, a red light-emitting diode housing portion connected to the central housing portion, a blue light-emitting housing portion connected to the central housing portion, a green light-emitting housing portion connected to the central housing portion and a projection lens housing portion connected to the central housing portion, and
wherein the prism is housed in the central housing portion, the red light-emitting diode assembly is housed in the red light-emitting diode housing portion, the blue light-emitting diode assembly is housed in the blue light-emitting housing portion, the green light-emitting diode assembly is housed in the green light-emitting housing portion and the projection lens assembly is housed in the projection lens housing portion.

10. The stereoscopic image display apparatus according to claim 9,
wherein the red light-emitting diode assembly includes a red light-emitting diode and a first light-condensing lens disposed between the red light-emitting diode and the first side of the prism, the blue light-emitting diode assembly includes a blue light-emitting diode and a second light-condensing lens disposed between the blue light-emitting diode and the second side of the prism and the green light-emitting diode assembly includes a green light-emitting diode and a third light-condensing lens disposed between the green light-emitting diode and the third side of the prism.

11. The stereoscopic image display apparatus according to claim 10,
wherein the projection lens assembly includes a modulation element, a diffusion lens and a collimator lens disposed between the modulation element and the diffusion lens with the modulation element disposed between the fourth side of the prism and the collimator lens.

* * * * *